A. FRIBERG.

Improvement in Cultivator.

No. 127,757. Patented June 11, 1872.

UNITED STATES PATENT OFFICE.

ANDREW FRIBERG, OF MOLINE, ILLINOIS.

IMPROVEMENT IN CULTIVATORS.

Specification forming part of Letters Patent No. 127,757, dated June 11, 1872.

SPECIFICATION.

*To all whom it may concern:*

Be it known that I, ANDREW FRIBERG, of Moline, in the county of Rock Island and State of Illinois, have invented certain Improvements in Cultivators, of which the following is a specification, reference being had to the accompanying drawing.

My invention relates to cultivators; and the invention consists in a tubular shank to which the shovel is attached, and which shank is pivoted to the beam and braced by a wooden pin, as hereinafter more fully explained.

Figure 1:
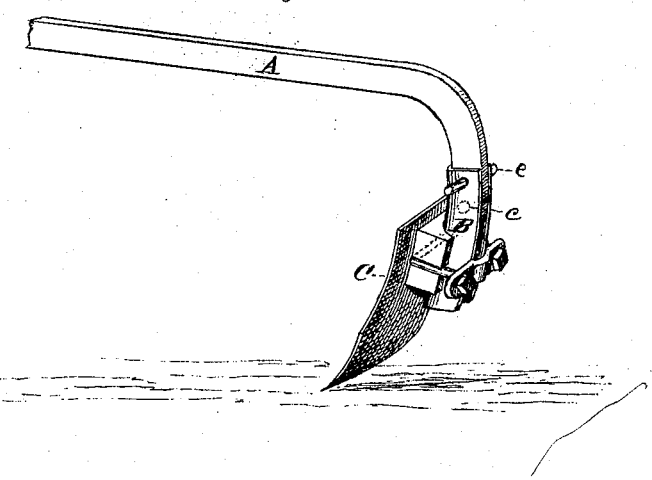
Figure 2:
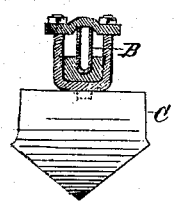
Figure 3:
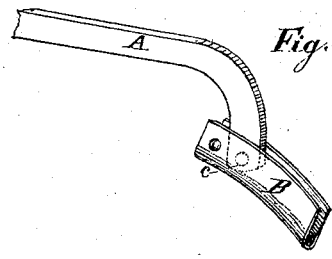

Figure 1 is a perspective view of a beam with the shank and shovel attached. Fig. 2 is a transverse section of the shank with the shovel attached; and Fig. 3 is a perspective view of the beam and shank, showing it in the position occupied when the pin is broken.

In the drawing, A represents the beam of a cultivator belonging to that class known as walking-cultivators, this beam consisting of a bar of iron bent to the required shape.

In constructing this class of cultivators it has been customary to attach the shovel directly to the lower end of the beam in one way or another, or to make the beam in two parts and unite them by a joint, the shovel being attached to the lower part.

The object of this invention is to construct a light and cheap shank, which can be readily pivoted to the beam in such a manner that it can be conveniently braced by a wooden pin, and on which also the shovel can be easily and readily adjusted, both vertically and laterally, as may be necessary.

To accomplish this, I take a piece of sheet metal of proper thickness and cut it of such a width that, when bent to the proper shape, it will clasp around the front and sides of the beam A, as represented by Fig. 1. Through this tubular shank B I make two holes—one near its upper end and the other lower down—there being corresponding holes made in the rear end of the beam A. By inserting an iron bolt, *c*, in the lower hole the shank B, is pivoted to the end of the beam so that it can turn freely on said bolt *c*. Through the upper hole I then insert a wooden pin, *e*, as shown in Fig. 1, by which means the shank B is braced or locked rigidly to the beam A. The shovel C is secured to the lower portion of the shank B by means of a stirrup or clasp, which permits it to be adjusted on the shank, but which, forming no part of this invention, need not be further described. When thus constructed and arranged it will be seen that the shovel is held rigidly in position for performing its ordinary work; but that, if it comes in contact with a fixed or hidden rock, root, or similar obstruction, the wooden pin *e* will break and permit the shank with its shovel to turn on the pivot or bolt *c*, as represented in Fig. 2, and thus the shovel will pass over the obstruction and save the parts from injury. By restoring it to position, and inserting another wooden pin in place of that broken, the implement is ready for use, as before.

This method or idea of using a wooden pin is old and well known, it having long been used in grain-drills, and more recently in cultivators; but heretofore, instead of this tubular shank, the beam itself was made in two parts, or a heavy bifurcated shank was used.

By my improvement the shank can be made of a piece of thin plate metal, first cut out in the form of a blank, then be placed in a press and at once formed into the required shape, either hot or cold. By this means I avoid all the labor, time, and expense required in the old process of forging the parts from solid bars of iron, and, at the same time, substitute machine for hand labor, thus greatly expediting and cheapening the process of their manufacture. It also is much lighter than the old style, requires less metal, and the metal used is so disposed as to impart the greatest amount of resistance or strength in the direction of the strain brought upon it. It also affords a bearing for the wooden pin on each side of the beam and close to it, whereby a smaller pin is made to subserve the purpose of locking the shank to the beam, and, altogether, it forms a light, strong, cheap, and complete device for the purpose required.

I am aware that cultivator-shovels have been made with their upper end bent into a U-shape and pivoted to the beam, and also that shovels have been made with grooved and also with slotted shanks attached permanently to the shovel, and that such have been used with break-pins, and therefore I do not claim such; but

Having thus described my invention, what I claim is—

1. A shank for cultivators, composed of a plate of wrought metal doubled or folded in the line of its length, so that its cross-section shall be of U-shape, whereby it is adapted to clasp around the front of the cultivator-beam, and to have a shovel attached thereto and adjusted thereon, substantially as described.

2. In combination with the above-described shank, I claim the shovel C, arranged to be adjusted up or down thereon, substantially as described.

3. I also claim the above-described shank B, pivoted to the beam A, and locked in position by a break-pin, with a shovel, C, attached thereto, all constructed and arranged to operate substantially as described.

A. FRIBERG.

Witnesses:
H. WOODWORTH,
SIMON A. KERNS.